US008001477B2

(12) United States Patent
Nauerz et al.

(10) Patent No.: US 8,001,477 B2
(45) Date of Patent: Aug. 16, 2011

(54) METHOD FOR EXCHANGING PORTLET CONFIGURATION DATA

(75) Inventors: Andreas Nauerz, Boeblingen (DE); Christian Krafft, Stuttgart (DE); Stefan Liesche, Boeblingen (DE); Brian Heumann, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 1150 days.

(21) Appl. No.: 11/464,334

(22) Filed: Aug. 14, 2006

(65) Prior Publication Data
US 2007/0124688 A1    May 31, 2007

(30) Foreign Application Priority Data

Nov. 11, 2005  (EP) .................................... 05110629

(51) Int. Cl.
G06F 3/00 (2006.01)
G06F 3/048 (2006.01)
(52) U.S. Cl. .......................... 715/742; 715/748; 715/769
(58) Field of Classification Search .................. 715/742, 715/748, 769
See application file for complete search history.

(56) References Cited

U.S. PATENT DOCUMENTS

| | | | | |
|---|---|---|---|---|
| 6,032,162 | A * | 2/2000 | Burke | 715/207 |
| 7,013,435 | B2 * | 3/2006 | Gallo et al. | 715/850 |
| 7,231,267 | B2 * | 6/2007 | Bournas et al. | 700/91 |
| 7,266,806 | B2 * | 9/2007 | Choi et al. | 717/108 |
| 7,281,060 | B2 * | 10/2007 | Hofmann et al. | 709/246 |
| 7,827,494 | B1 * | 11/2010 | Hedayatpour et al. | 715/742 |
| 2003/0163513 | A1 * | 8/2003 | Schaeck et al. | 709/201 |
| 2003/0167315 | A1 * | 9/2003 | Chowdhry et al. | 709/218 |
| 2004/0068554 | A1 * | 4/2004 | Bales et al. | 709/218 |
| 2004/0090969 | A1 * | 5/2004 | Jerrard-Dunne et al. | 370/395.54 |
| 2004/0225554 | A1 * | 11/2004 | Chiappetta et al. | 705/10 |
| 2005/0166188 | A1 * | 7/2005 | Secrist et al. | 717/136 |
| 2005/0198615 | A1 * | 9/2005 | Choi et al. | 717/108 |
| 2005/0256940 | A1 * | 11/2005 | Henderson et al. | 709/219 |
| 2006/0004913 | A1 * | 1/2006 | Chong | 709/217 |
| 2006/0212855 | A1 * | 9/2006 | Bournas et al. | 717/140 |
| 2007/0006075 | A1 * | 1/2007 | Lection et al. | 715/530 |
| 2007/0016429 | A1 * | 1/2007 | Bournas et al. | 705/1 |
| 2008/0066079 | A1 * | 3/2008 | Nauerz et al. | 719/312 |

OTHER PUBLICATIONS

Manning. "JXTA Technology for XML Messaging."; OASIS Symposium; Apr. 27, 2004.*

(Continued)

*Primary Examiner* — Doug Hutton
*Assistant Examiner* — Soumya Dasgupta
(74) *Attorney, Agent, or Firm* — Raymond Szeto; Hoffman Warnick LLC

(57) ABSTRACT

The invention relates to method for exchanging portlet configuration data. The method includes: providing a graphical user interface (GUI) component as part of a portlet view provided by a portal page for triggering a portlet configuration exchange process between a first user using a first portlet instance and a second user using a second portlet instance within the same portal, the first and second portlet instances being of the same portlet type, providing an export functionality allowing access to stored portlet configuration data of the first portal instance and transforming the stored portlet configuration data into a data structure for exchange purposes, allowing for exchange of the data structure via a defined communication channel between the first user and the second user, and providing an import functionality allowing for parsing of the data structure to provide new portlet configuration data of the second portlet instance and storing the new portlet configuration data of the second portlet instance.

10 Claims, 8 Drawing Sheets

OTHER PUBLICATIONS

NPL Reference U—"Defintion of Portal". http://www.webopedia.com/TERM/p/portal.html.*

NPL Reference V—"Defintion of Portlet"—http://www.webopedia.com/TERM/p/portlet.html.*

* cited by examiner

```
<?xml version="1.0"?>
<portlet userA>
<title>Settings </title>
<entry>
    <name>backgroundcolour </name>
    <value>green </value>
</entry>
<entry>
    <name>font </name>
    <entry>
        <name>style </name>
        <value>Arial </value>
    </entry>
    <entry>
        <name>size </name>
        <value>12pt </value>
    </entry>
</entry>
<entry>
...
</entry>
...
</portlet userA>
```

FIG. 1

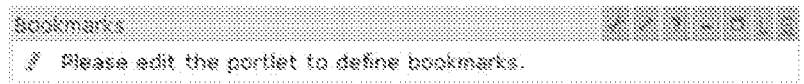
FIG. 8a
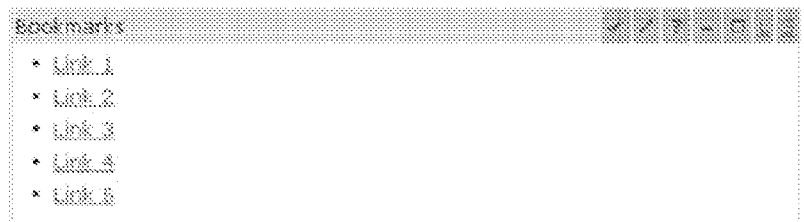
FIG. 8b
FIG. 8c
test.dat      0 KB    DAT File      2/8/2005 12:59 AM
FIG. 8d
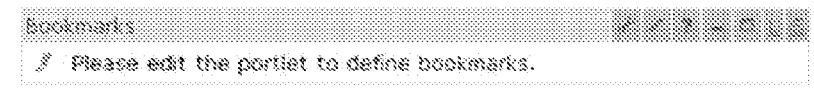
FIG. 8e
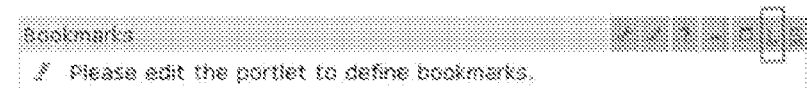
FIG. 8f
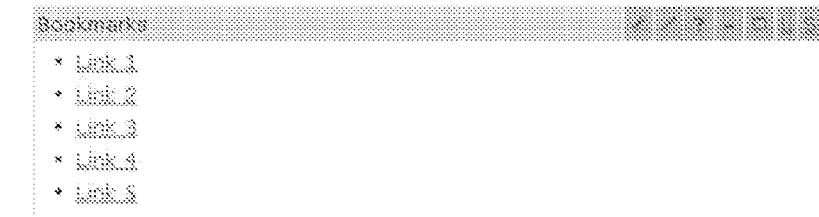
FIG. 8g

METHOD FOR EXCHANGING PORTLET CONFIGURATION DATA

FIELD OF THE INVENTION

The present invention refers to the field of portals and, more particularly, to a method, communication system, and computer program product for exchanging configuration data of portlets within a portal community.

BACKGROUND OF THE INVENTION

Portal is a term for a World Wide Web site that is a major starting site for users when they get connected to the web or that users tend to visit as an anchor site, linking to many other sites. The portal refers to the virtual "door" that a user walks through every time the user wants to access the Internet; this is the first screen that a user sees when going online. A portal as a Web site "gateway" provides multiple services, which could include Web searching capability, news, free-email, discussion groups, online shopping, references and other services and sometimes a community forum. Although the term was initially used to refer to general purpose sites, it is increasingly being used to refer to vertical market sites that offer the same services, but only to a particular industry such as banking, insurance or computers. A more recent trend is to use the same term for sites that offer services to customers of particular industries, such as a Web-based bank "portal", on which customers can access their checking, savings and investment accounts. The first Web portals were online services that provided access to the Web, but by now most of the traditional search engines have transformed themselves into Web portals to attract and keep a larger audience. Some portals offer users the ability to personalize that web site according to individual interests. Portals provide a secure, single point of interaction with diverse information, business processes, and people, personalized to a user's need and responsibilities.

The building blocks of portals are portlets, which are held in containers, which in turn are contained by a portal page. That means that a portal consists of pages which include containers which in turn are composed of portlets. A portlet can be regarded as a pluggable user-interface component to provide a presentation layer to an information system. The portlet container, the portlets' runtime environment and a core component of each portal requires knowledge about the portal itself and must reuse common code from it. Consequently, the portlet container remains completely separated from every other portal component. Portlets contain portions of content, that means single applications, and markup languages such as HTML (HyperText Mark-up Language) and XML (eXtensible Mark-up Language). A portlet can be described as a small window on a portal page. The portlets can be minimized and often comprise consistent help and configuration menus. Portlet technology allows a portal page to be customized more quickly either internally by a development team or by an end user. Portlet technology can come as an adjunct to a portal server or as optional interfaces to ERP (Enterprise Resource Planning) applications. The degree of customization also varies. Portlet windows can be entry points to a variety of services. Functionalities of a specific portlet are adopted from the portlet's own configuration. A portlet is an integration component between applications and portals that enables delivery of an application through a portal.

A bookmark portlet provides, for example, a way to store names and URLs (Uniform Resource Locators) of Web sites. After a bookmark is created, clicking the link opens the site in a new browser window of a corresponding display of a computer. The bookmark portlet shows all of the bookmarks in a folder of a user's choosing.

Specifications which are relevant for portals are JSR-168 (Java Specification Request 168) and OASIS-Standard WSRP (Web Service for Remote Portlets). Most portal solutions are programmed using Java, thus achieving best system independence (Java and all Java-based trademarks are trademarks of Sun Microsystems, Inc. in the United States, other countries, or both). A portlet is a small program written in Java and usable as an add-on of the corresponding portal. On client side, portlets are represented within a browser as an easy manageable user interface with icons for maximizing, minimizing, editing and for help. Internally, namely on server side, any application can be lodged which transfers its presentation to the portlet. Portlets provide a way of dividing development tasks and incrementally developing the capabilities of a site. Portlets represent discrete pieces of functionality that can be written and deployed over time.

Today portlets are mainly installed by portal administrators. Moreover, pages acting as the containers for a set of portlets are assembled by portal administrators, too. As already described above, a portlet is a web component, that provides access to web-based content, applications, and other resources. A portlet can process requests and generate dynamic content. Portals use portlets as pluggable user interface components to provide a presentation layer to information systems. Portlets may be represented by a text hyperlink or a graphical icon located beside or above such a text hyperlink. The appearance, the design and the functionalities of a portlet are defined by and based on the portlet's own configuration data. The configuration data can define, in principle, all information and properties of a portlet, even its optical design such as its height, width, background and font, and also functional properties. The configuration data are stored in the so-called portlet descriptor. During the deployment those initial configuration data are used and disposed in a local database. The configuration data can be supplemented by user actions. Those non-initial configuration data are also stored in the already mentioned local database. Usually portlets are not pre-configured, as the portal administrator is not interested in using these portlets in some business context, nor does the administrator have the knowledge and/or time to pre-configure each portlet he installed meaningfully for every single portal user or user group.

This leads to scenarios where every portal user has to configure a portlet themselves, even if other portal users within the same portal community might already have done some similar portlet configuration. Letting more than one user within a portal community perform similar configuration tasks of portlets used, costs time and hence money due to the fact that the similar work is done redundantly. Besides that, there might be users acting in the same portal community which do not know how to configure a certain portlet within the portal community accordingly. Such users would highly appreciate a meaningful pre-configuration of the portlets they want to use.

An exchange of pre-configuration data could also increase the value of a certain portlet, as more people set meaningful preferences and make the portlet itself more powerful because of a queued exchange of preferences. This could also allow for versioning of pre-configuration data always allowing users to decide which version to apply/use.

Currently, portlet configurations or portlet configuration data can only be exchanged among users within a portal community by means of a phone call or by exchanging mails on the basis of which a manual synchronisation of the portlet configuration can be performed. Moreover, configuration data of pre-configured portlets cannot be exchanged due to the fact that portals utilize a centralized administration model and provide no way for decentralized exchange of portlet configuration data.

Therefore, it would be desirable to provide a method for exchanging portlet configuration data among portal users.

SUMMARY OF THE INVENTION

The present invention proposes a method for exchanging portlet configuration data among at least one first user using a first portlet and at least one second user using a second portlet of same type within a portal community, a portal for exchanging portlet configuration data within a portal community, and an associated computer program product.

A first aspect of the invention provides a method for exchanging portlet configuration data of a portal, comprising: providing a graphical user interface (GUI) component as part of a portlet view provided by a portal page for triggering a portlet configuration exchange process between a first user using a first portlet instance and a second user using a second portlet instance within the same portal, the first and second portlet instances being of the same portlet type, providing an export functionality allowing access to stored portlet configuration data of the first portal instance and transforming the stored portlet configuration data into a data structure for exchange purposes, allowing for exchange of the data structure via a defined communication channel between the first user and the second user, and providing an import functionality allowing for parsing of the data structure to provide new portlet configuration data of the second portlet instance and storing the new portlet configuration data of the second portlet instance.

An activation of the writing component and/or the specific importing component can be performed via a graphical user interface announcing the respective trigger means. Those trigger means can be displayed as tags, for example, in an appropriate toolbar of a browser window. The writing component and/or the importing component can thus be activated via an activation of those respective tags. Those tags can also be displayed within each portlet, e.g. at the top of each portlet. It is also possible, however, that the writing component is automatically activated whenever the portlet configuration data change. Such a change within the portlet configuration data acts then as a trigger means. The importing component can also be activated automatically whenever such a data structure comprising portlet configuration data is communicated to the second user. In such a case the communication of the portlet configuration data acts as a trigger means. Different kinds of trigger means can be implemented individually for and thus provided by a portal.

The proposed method allows a decentralized distribution of portlet configuration data among portal users. The proposed method describes a mechanism allowing the export of a portlet configuration in order to import it into another portlet. The configuration data are written in a data structure, as for example into a configuration file describing the portlet's configuration. The data structure is transmitted via some available communication medium and read in after having been imported in a receiving portlet.

The writing component and/or the importing component can be activated via the respective portlet. That means that the respective portlet provides a hyperlink or an icon via which the writing component and the importing component, respectively, can be activated by a user of the respective portlet.

The writing component and/or the importing component can be activated via a configuration instance which is separated from the respective portlet. That means that a configuration instance which is external and separated from the portlets is used in order to control and activate the respective components.

In another embodiment of the method according to the present invention the first portlet and the second portlet are chosen as being of the same type, hence being able to understand the configuration data of each other. The portlets can be for example bookmark portlets or customer search portlets.

The step of communicating the data structure via an available communication medium can be performed on request. That means that the second user can ask for the configuration data of the first portlet, which initiates the step of communicating the data structure describing the configuration data to the first portlet.

The step of communicating the data structure can be performed automatically. That means for example that whenever the configuration data of the first portlet is written in a data structure, that data structure is automatically communicated to the at least one second user. The at least one second user can be pre-selected as a receiving user of the portlet configuration data of the first portlet. The pre-selection of the at least one second user can be initiated due to a subscription of the second user in a corresponding subscription list.

All users within such a subscription list can be automatically supplied with the configuration data of the first portlet whenever the configuration of the first portlet changes. Of course, there is the option that before the new configuration data is applied the user is prompted whether he wants to make use of them.

In a further step of the method the second portlet is configured based on the imported and read data structure communicated to the second user via the communication medium.

The communication medium by means of which the data structure describing the configuration data of the first portlet can be communicated to the at least one second user is secured against unauthorized access to the data structure. That means that it is possible that the data structure generated on the basis of the configuration data of the first portlet is only communicated to the second user when the second user is authorized to receive that data structure. As such, the second user has to identify themselves before having access to the data structure.

Such an authorization can be performed by general access control features which could e.g. be part of a document management system acting as repository for storing the configuration data.

In a further embodiment of the method according to the present invention the step of communicating the data structure to the second user is realized by a mail exchange via a mail client. The mail client is a functionality that can be used to read and send electronic mails (emails).

In another embodiment of the method according to the present invention the step of communicating the data structure to the second user is realized by legacy file transfer. This can be for example FTP (File Transfer Protocol), NFS (Network File System) or SAMBA™.

The communication can correspond to an exchange via a physical media like for example a CD or a disk.

An illustrative scenario in which the communicating step is performed via a file exchange as described above can be as follows:

The at least one first user visits the first portlet for which configuration data should be exported. The first user can click or activate an exchanging trigger function triggering the export mechanism for the first portlet. Furthermore, the first user can then specify where to export the configuration data. That means that the first user can determine a location on a physical media where the configuration file should be stored or the at least one second user as authorized receiving user. By activating the writing component the configuration data is written in a data structure, namely in that scenario in a describing export file. It is possible that the activation of the exchanging trigger function involves or even corresponds to an activation of the writing component. The export file is transmitted or communicated via some communication medium, in that case a communication channel to the at least one second user which is the receiving user. The at least one second user receives the file describing the configuration data of the first portlet. The at least one second user visits the second portlet for which the configuration should be imported. Importing and reading the file in the second portlet is triggered by an importing trigger function for the second portlet. The file is then imported and read in the second portlet by activating a respective importing component and the configuration is performed based on that imported and read file.

In a further embodiment of the method according to the present invention the communication medium is chosen as a document management system (DMS) which is adapted for storing the data structure thus making the data structure available to the at least one second user. The document management system allows the at least one second user to access the system from various graphics devices such as PCs, workstations, X-terminals and other sorts of terminals. Generally, such a document management system allows different data formats to be used in different activities. Such a document management system can provide a user interface which can be common to all graphics devices in the portal community. The user interface is generally easy to understand and use. It is suitable for casual and frequent users. It can offer an online help facility. Furthermore, it can include icon-driven, forms-driven and manual-driven approaches. Such a document management system supports a sufficient and secure interaction between the at least one first user and the at least one second user within the portal community. The document management system provides a sufficient and secured data exchange and data translation functionality for such kind of data structure. By means of such a document management system a plurality of users can have access to the data structure stored within the document management system simultaneously. There is no need for a legacy exchange mechanism like an external mail client, a file transfer software or any physical media. Furthermore, the document management system allows for access control. That means that it is easy to control who has the right to import certain configuration data. Moreover, it is possible to store within a document management system several different versions of configuration data of one and the same portlet. The document management system thus allows for versioning. The at least one second user can decide which version to be used and rollback to an older version when desired or when needed.

In a further embodiment of the method of the present invention, the step of communicating the data structure to the at least one second user is realized by JXTA™. In computer networking, JXTA (Juxtapose) is Sun Microsystem's open-source-based peer-to-peer infrastructure. JXTA technology is a set of open protocols that allow any connected device on the network ranging from cell phones and wireless PDAs to PCs and servers to communicate and collaborate in a P2P manner. JXTA peers create a virtual network where any peer can interact with other peers and resources directly even when some peers and resources are behind firewalls or are on different network transports. By means of JXTA the data structure describing the portlet configuration data can be directly transmitted via JXTA to the at least one second user dedicated by the at least one first user.

By means of JXTA technology it is even possible that the data structure describing the portlet configuration data is directly transmitted to an entire set of second users. That means that the data structure is broadcasted to a dedicated set of second users. As already described above, the respective second users receive the data structure and can now activate an importing component as an importing trigger function for their respective second portlets triggering an respective import mechanism so that the data structure is imported and read in the respective second portlets. Based on the imported data structure, the respective second portlets can now be configured.

As already described above, the at least one second user or the plurality of second users can subscribe to a configuration of a specific type of first portlet. When the first user visits the first portlet for which a configuration should be exported or changed, he can activate an exchanging trigger function for the first portlet triggering thus the export mechanism. That means that the portlet configuration data of the first portlet are written in a data structure as for example in a file. That file can then be stored in a specific document management system. The at least one second user or the plurality of second users which have subscribed to the configuration of that specific type of first portlet are informed about the change of the configuration of that portlet. The at least one second user can now decide whether he wants to import the file describing the portlet configuration data or not. In case that the user wants to import the file the user can activate an importing trigger function for its second portlet thus triggering importing and reading the file in the second portlet. The file is read and serves as basis for the configuration of the respective second portlet. It is also possible that the at least one second user does not have to decide to use the file describing the portlet configuration data, but that all second portlets of subscribed users using the configuration described by the file adapt automatically.

The present invention is also directed to a communication system within a portal community for exchanging portlet configuration data among at least one first user using a first portlet and at least one second user using a second portlet. The communication system according to the present invention comprises compiling means configured to compile the portlet configuration data of the first portlet which are stored in a data storage medium accessible by the first user, writing means adapted to write the portlet configuration data of the first portlet in a transferable data structure, a communication medium adapted to communicate the data structure to the second user, importing and reading means adapted to import and read the data structure in the second portlet, and trigger means configured to activate the respective means.

The communication system can also comprise means adapted to configure the second portlet based on the data structure being imported and read in the second portlet.

In another embodiment of the communication system according to the present invention the communication system further comprises an administrator means configured to centrally initiate and manage exchanging and/or importing of the portlet configuration data among the at least one first user using the first portlet and the at least one second user using the second portlet.

The communication medium can be realized by an exchange mechanism. In that case the data structure describing the portlet configuration data of the first portlet is stored on a file and transported via an exchange mechanism as for example via an email exchange or another legacy file transfer to the at least one second user. It is also possible that the file describing the portlet configuration data is stored on a physical media like a CD or a disk.

In another embodiment of the system according to the present invention the communication medium is realized by a document management system which is adapted to generate and store the data structure thus making the data structure available for the at least one second user. The document management system represents a system method for storing, locating and keeping track of the configuration data that is usable or valuable to a configuration of a further portlet of the same type. The document management system has the ability to manage that configuration information, to distribute the configuration information, and to allow secure access to a plurality of second users. In contrast to the use of an exchange mechanism, in the case of the document management system no direct peer-to-peer transfer is needed. Each user of a plurality of second users who are authorized to have access to the document management system can read the respective file and import it in its respective second portlet. By means of the document management system it is also possible to store not only the latest version of the portlet configuration data but a history of several versions so that a second user who has access to the document management system can choose which version of the portlet configuration data he wants to import and use as basis for the configuration of its own second portlet.

In still another embodiment of the system according to the present invention the communication medium is realized by a JXTA technology. The JXTA technology allows any connected device on a virtual network to communicate and collaborate in a peer-to-peer manner. Any second user who is connected with the at least one first user via the JXTA technology is able to directly interact with the at least one first user.

The communication system can also comprise means adapted to support a subscription mechanism for the at least one second user to be subscribed as receiving user of the data structure describing the portlet configuration data of the first portlet.

The present invention also refers to a portal within a portal community with means adapted to activate writing of configuration data of the portlet in a data structure, means to activate exporting the data structure and means to activate importing and reading such a data structure.

The present invention also covers a computer program with program coding means which are suitable for carrying out a method according to the present invention when the computer program is run on a computer.

A computer-readable medium with a computer program stored thereon is also provided, the computer program comprising program coding means which are suitable for carrying out a method according to the present invention when the computer program is run on a computer.

The present invention also refers to a computer program product with a computer-readable medium and a computer program stored on the computer-readable medium with program coding means which are suitable for carrying out a method according to the present invention when the computer program is run on a computer.

Further features and embodiments of the invention will become apparent from the description and the accompanying drawings.

It will be understood that the features mentioned above and those described hereinafter can be used not only in the combination as specified but also in other combinations or on their own, without departing from the scope of the present invention.

The invention is schematically illustrated in the drawings by way of an example and is hereinafter explained in detail with reference to the drawings. It is understood that the description is in no way limiting on the scope of the present invention and is merely an illustration of a preferred embodiment of the invention.

BRIEF DESCRIPTION OF THE DRAWINGS

Other aspects and advantages of the invention will become apparent upon review of the detailed description and upon reference of the drawings.

FIG. 1 shows an illustrative portlet configuration data file in XML format.

FIG. 8 shows an embodiment of an illustrative portlet according to the present invention.

DETAILED DESCRIPTION OF THE INVENTION

FIG. 1 shows an illustrative configuration data file of a portlet defined by a user A in XML format. Only two settings (background colour and text font) are given to demonstrate the principle of the file. In principle it includes name-value pairs (background colour=green) which could possibly be nested (text font=(style=Arial, size=12 pt)). Various settings could follow ( . . . ).

Figure 2:
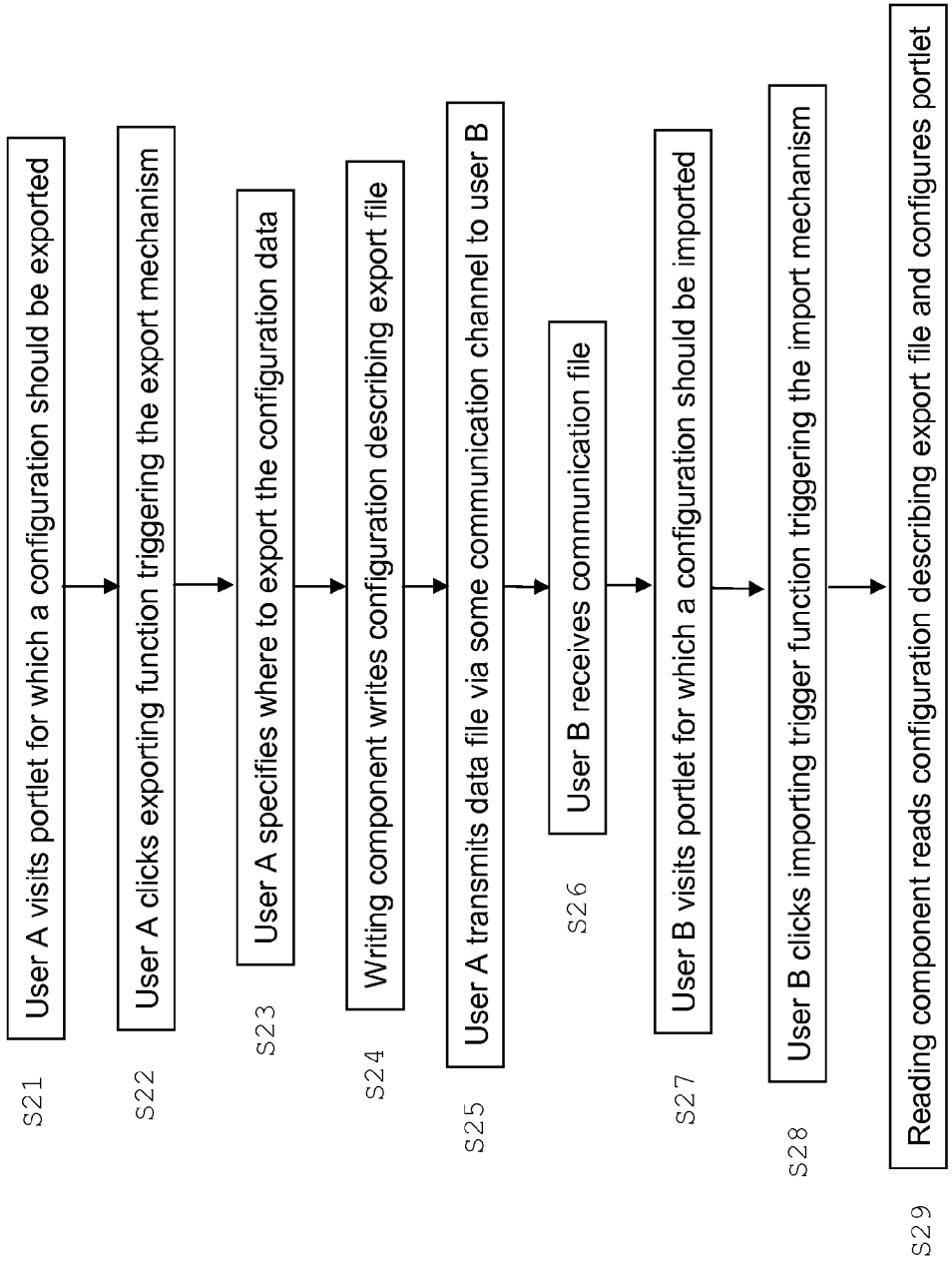
FIG. 2 shows a sequence flow illustrating related procedures according to an embodiment of the method according to the present invention.

FIG. 2 shows sequence flows according to a possible embodiment of the method according to the present invention. In a first step S21 a first user A visits or uses in a portal a first portlet for which a configuration or configuration data should be exported. The configuration data are stored in a data storage medium which is accessible for the first user A. In step S22 the first user A activates or clicks an exporting function which is provided by the portal triggering an export mechanism. That means that changes concerning portlet configuration data will be tracked in order to making those configuration data available to at least one second user of a second portlet which is of the same type as the first portlet, hence able to understand the configuration data of the first portlet. In step S23 the first user A specifies where to export the portlet configuration data. In step S23 the first user can decide to whom the user wants to transmit the configuration data of the first portlet. In step S24 the configuration data are compiled from the data storage medium and are written via a specific writing component in a transferable data structure describing the configuration data. This data structure can be, as shown here, a data file, i.e. a so-called export file. For example the writing component can be a XML parser which writes the configuration data to a file in XML format as given in FIG. 1. That file can be stored on a hard disk or on another appropriate storage medium. This can be for example a physical medium like a CD or a disk. In step S25 the first user A transmits the data file via some communication channel to the at least one second user B. A possible communication channel is for example an email exchange via a mail application which can be implemented in the portal. It is also possible to transmit the file via legacy file transfer as for example FTP, NFS or SAMBA™. It is also possible that the first user A gives the second user B a CD or a disk on which the data file is stored. In step S26 the second user B receives the communication file. In step S27 the second user B visits the second portlet for which a configuration should be imported. In step S28 the second user B activates or clicks an importing trigger function which is provided by the portal thus triggering the import mechanism. In step S29 because of the triggering the configuration file is imported and read in the second portlet by means of a reading component. Again, for the example of a configuration data file written in XML format, the reading component can be a XML parser. A configuration of the second portlet based on that data file can now be performed.

Figure 3:
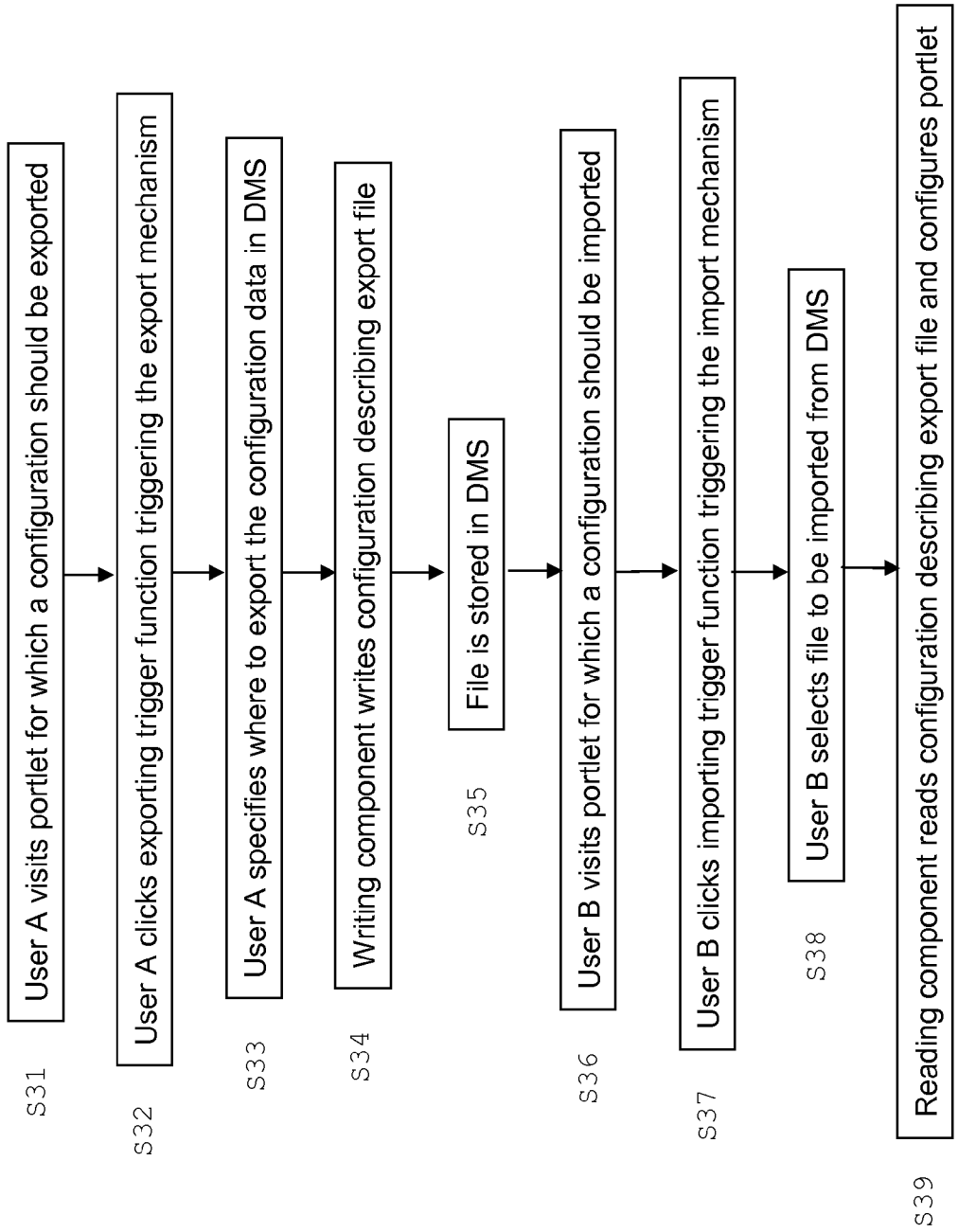
FIG. 3 shows sequence flows illustrating related procedures according to another embodiment of the method according to the present invention.

FIG. 3 shows another scenario in which portlet configuration data are exported from a first portlet of a portal and imported in a second portlet of the portal. Generally the first and the second portlet are of the same type. In step S31 a first user A using the first portlet visits that first portlet. In step S32 the first user A activates an exporting trigger function.

Unlike the scenario described in FIG. 2 the portlet configuration data are exported in this scenario via a document management system (DMS). Such a document management system can also be described as a portlet document manager which is available in a portal in which the portlets in question are incorporated.

In step S33 the first user A can specify where to export the portlet configuration data of the first portlet in the document management system. That means that the first user A indicated in which memory of the document management system the portlet configuration data are to be stored.

In step S34 the portlet configuration data are written in a transferable corresponding file which is stored in step S35 in the memory of the document management system which is dedicated by the first user A.

In step S36 at least one second user B visits the second portlet for which a configuration should be imported. The second portlet is of the same type as the first portlet and can understand and use the portlet configuration data of the first portlet for its own configuration.

In step S37 the second user B activates an importing trigger function provided by the portal thus triggering an import mechanism. In step S38 the second user B accesses to the document management system where the file describing the configuration data of the first portlet is stored. The second user B selects the file to be imported from the respective memory of the document management system. The access to the document management system can be secured. To this extent, the second user B can only have access if the second user B is allowed to have access to the document management system. It is possible that the second user B has to identify himself as an authorized user. Such an authorization mechanism can be performed by means of a password or another kind of key.

In step S39 the file describing the portlet configuration data of the first portlet is read and imported in the second portlet of the second user B. Based on that file the second portlet can now be configured.

A document management system which can be implemented in the portal in which the portlets in question are incorporated allows for access control. A document management system can incorporate a control function controlling who has the right to import a certain configuration file. A document management system also allows for versioning. That means that the second user which has access to the document management system and who wants to import a certain configuration file which is stored in the document management system can decide which version to be used and even can rollback to an older version when needed. By means of a document management system it is possible to store a history of portlet configuration data and afterwards to track the different versions.

Figure 4:
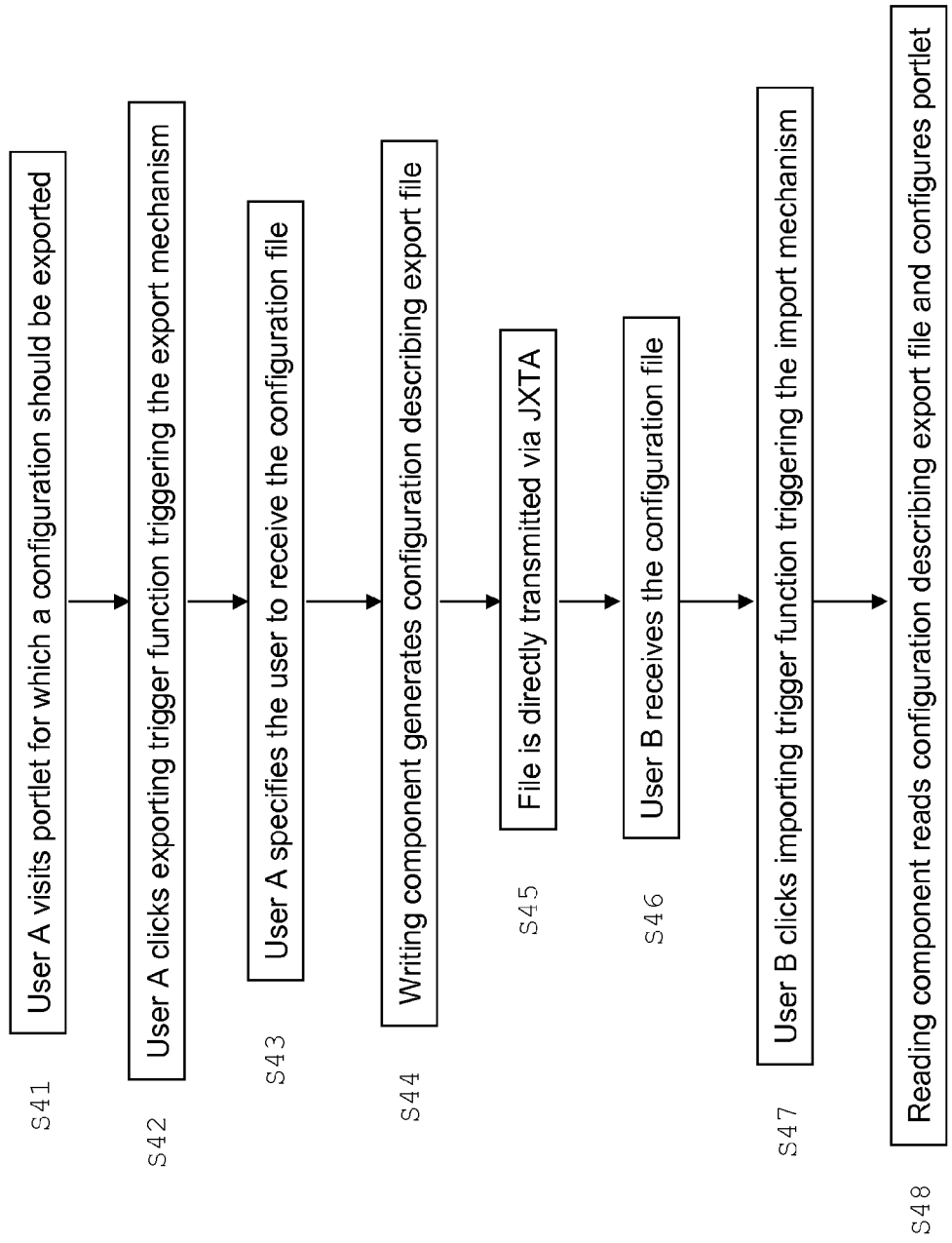
FIG. 4 shows sequence flows illustrating related procedures according to a further embodiment of the method according to the present invention.

FIG. 4 describes a further scenario of a method according to the present invention. In this scenario portlet configuration data from a first portlet of a portal are exported and imported in a second portlet of the portal via JXTA technology. In a first step S41 a first user visits the first portlet for which a configuration should be exported. The configuration data are usually stored in a data storage medium.

In a second step S42 the first user A actuates an exporting trigger function thus triggering the export mechanism.

The first user A specifies in step S43 the second user B which should receive the portlet configuration data. In step S44 the portlet configuration data are compiled from the data storage medium and are written in a export file by means of a writing component which is activated by a write command. The writing component can be involved in the exporting trigger function. In step S45 the file describing the portlet configuration data is directly transmitted via JXTA to the at least one second user which has been selected by the first user A as receiving user. In step S46 the second user B receives that configuration file. In step S47 the second user B activates an importing trigger function triggering an import mechanism.

In step S48 a reading component reads, activated by the second user B or automatically, the configuration file describing the portlet configuration data and imports this file in the second portlet. The second portlet can now be configured on the basis of that configuration file. With the help of the JXTA technology it is possible to perform a direct transmission of the configuration data to a dedicated user.

Figure 5:
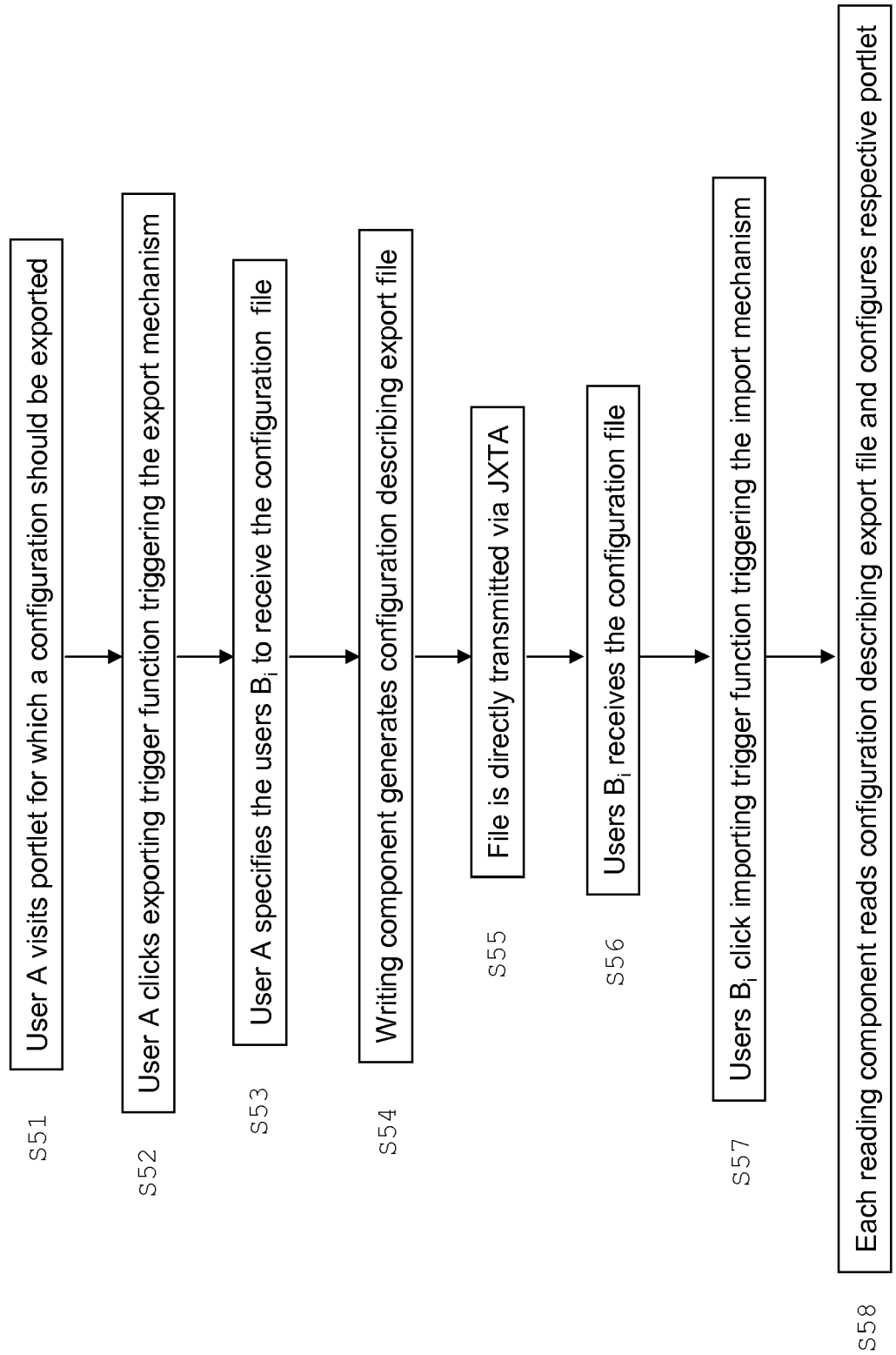
FIG. 5 shows sequence flows illustrating related procedures according to still a further embodiment of the method according to the present invention.

FIG. 5 describes yet a further scenario of the method of the present invention. In this scenario the JXTA technology is also used for exporting and importing portlet configuration data. In a first step S51 a first user A visits in a portal a first portlet for which configuration should be exported. Afterwards the first user A activates an exporting trigger function triggering the export mechanism in step S52. Then, in step S53 the first user A specifies all the second users $B_i$ which are allowed to receive the portlet configuration data. This means that the first user A is able to broadcast the configuration data by means of the JXTA technology. In step S54 a file is generated describing the portlet configuration data. This file is directly transmitted in step S55 via the JXTA technology. The second users $B_i$ determined by the first user A as receiving users receive in step S56 the configuration file and import it in step S57 by activating an importing trigger function in their respective second portlets. In step S58 the configuration file is imported and read in the second portlets of the corresponding second users $B_i$. The second portlets are configured based on that configuration file.

Figure 6:
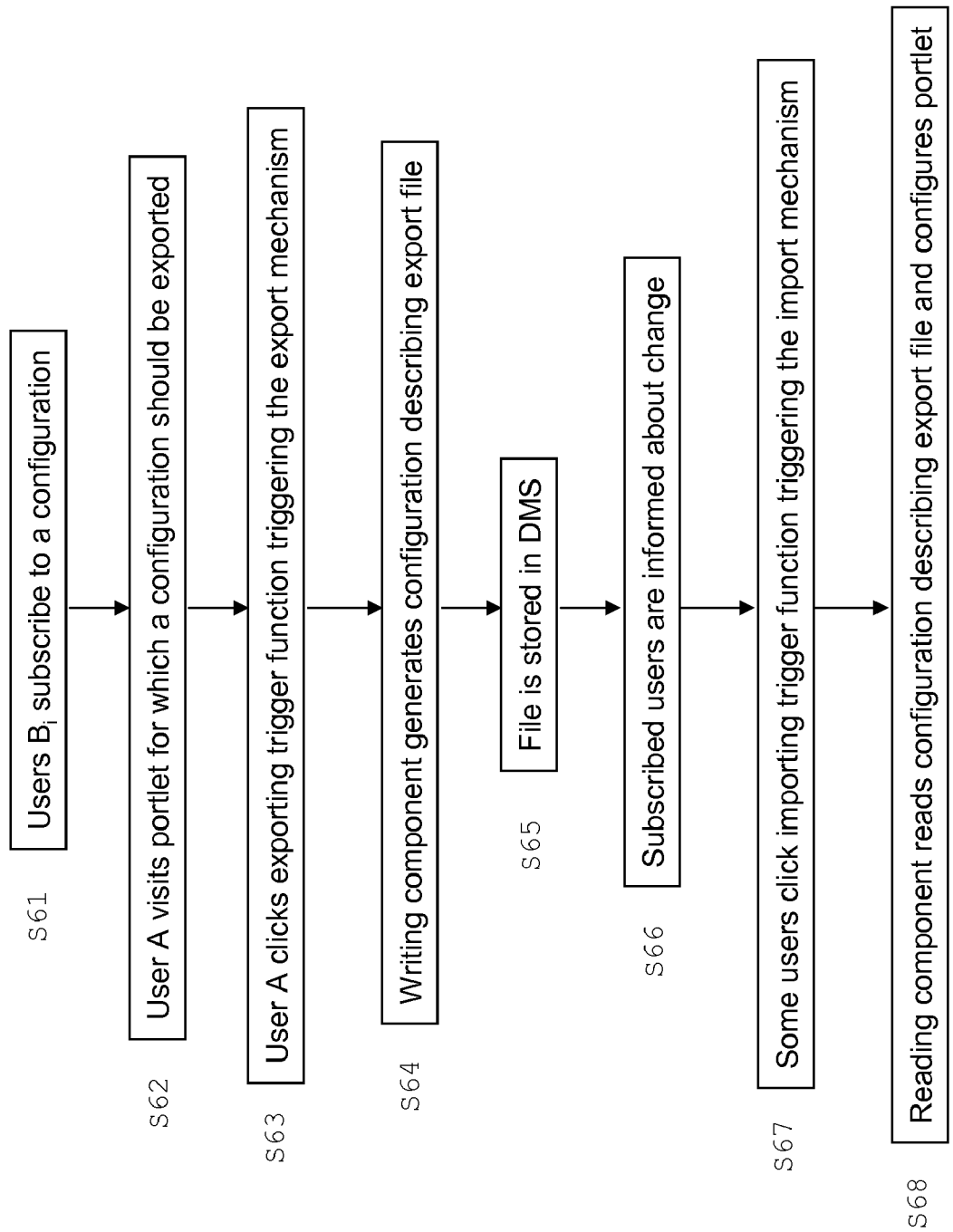
FIG. 6 shows sequence flows illustrating related procedures according to a further embodiment of the method according to the present invention.

FIG. 6 describes the use of a published and subscribed mechanism with respect to exporting and importing portlet configuration data. In a first step S61 a plurality of second users $B_i$ using respective second portlets subscribe to a specific configuration, namely to a configuration of a specific first portlet. The second portlets and the first portlet are generally of the same type. In a second step S62 a first user A using the first portlet visits that first portlet for which a configuration should be exported and/or changed. In step S63 the first user A activates via an exporting trigger function an export mechanism. In step S64 the portlet configuration data of the first portlet are written by means of a writing component of the first portlet in a corresponding data structure as for example in an export file. The writing component is activated for example by a write command which can be involved by the exporting trigger function. The file is stored in step S65 in a document management system. In step S66 the subscribed second users $B_i$ are automatically informed about that file which is newly stored in the document management system. The second subscribed users $B_i$ can be prompted and can decide to use or to import the new version of the configuration data of the first portlet which is described by the file stored in the document management system. In that case the second users $B_i$ or some of the plurality of second users $B_i$ who want to import and read the new portlet configuration data of the first portlet activate in step S67 an importing trigger function thus triggering an import mechanism. When initiating the import mechanism the file is read in step S68 by means of a reading component and the second portlets can be configured accordingly.

It is also possible that the second users $B_i$ do not have to decide whether they want to use a new version or not but that all second portlets using the same configuration as the first portlet adapt automatically.

Figure 7:
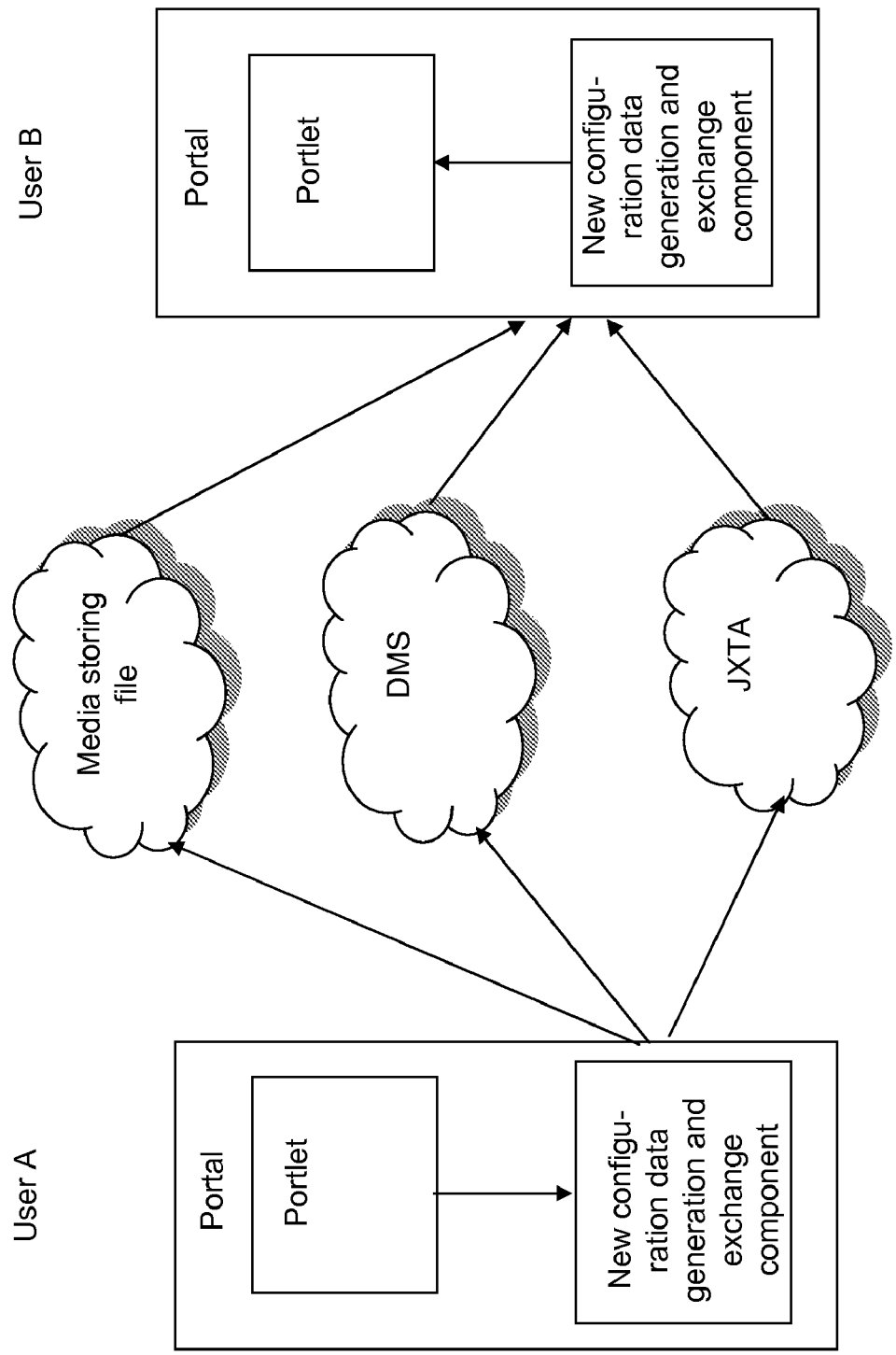
FIG. 7 shows an illustrative architecture of an embodiment of the system according to the present invention.

FIG. 7 shows a schematically described architecture in which a method according to the present invention can be used. On the left side a first user A is shown using via a first personal computer for example a first portlet incorporated in a specific portal. On the right side a second user B is shown using via a second personal computer, for example, a second portlet which is of the same type as the first portlet and also incorporated in the portal. The first user configures his first portlet and the portlet configuration data are stored in a data storage medium which is accessible for the first user A. This data storage medium is usually a hard disk of the first personal computer. Every other suitable data storage medium is also possible, as for example a cache or a RAM. The configuration data are then compiled from the respective data storage medium and are written in a specific transferable data structure. This data structure should be available for the second user B so that he can also configure the second portlet on the basis of the portlet configuration data of the first portlet. There are different possibilities of how to transmit the data structure to the second user B. For example, it is possible to store the data structure on an exchangeable media as for example on a physical media like a CD or a disk or to store it in a file on a hard disk valuable to exchange this file via an email exchange.

It is also possible to store the data structure as file in a document management system (DMS) which can be incorporated in or be part of the portal used by the first and second users. The second user B must have access to the document management system for importing the file describing the portlet configuration data of the first portlet.

It is also possible to use the JXTA technology in order to transmit the data structure from the first user A to the second user B.

FIGS. 8a-8g describe further possible procedures according to the method of the present invention considering as example a bookmark portlet as part of a portal. The bookmark portlet in its initial state does not contain any bookmarks (FIG. 8a). New users within an enterprise for example would highly appreciate to get a pre-configured bookmark portlet containing for example the most important intranet links. The initial configuration data are, as already mentioned, usually stored in a hard disk of a user's personal computer for example.

As can be seen in FIG. 8a, the bookmark portlet having a toolbar is initially empty. The toolbar displays the name of the portlet "Bookmarks" and shows several icons, each icon annotated by a specific symbol. Each symbol describes or gives a hint to a specific functionality which can be activated when clicking that specific icon. The icon annotated by a "S" has to be activated if a user of the portlet wants to store data contents of the bookmark portlet in a transferable data structure. The icon annotated by "L" triggers a loading or importing mechanism by means of which it would be possible to import and read a corresponding data structure.

FIG. 8b shows the bookmark portlet in a further status, namely after having been pre-configured by an experienced user. The bookmark portlet comprises now five different links as bookmarks. The user of the bookmark portlet can now use the icon "S" to store the bookmarks he has configured in a transferable data structure as it is indicated by a rectangular border strip in FIG. 8c.

The configuration file can for example be locally stored in a transferable data structure on disk (FIG. 8d).

If another user, namely at least one second user, wants to use via his computer, for example, a second bookmark portlet of the same type as the first bookmark portlet which is, however, still empty (FIG. 8e), the configuration file stored in the transferable data structure on disk can now be sent to that at least one second user for example via an email exchange.

The at least one second user can import the data structure in the second portlet using the icon "L" as indicated in FIG. 8f by a rectangle. By clicking the icon "L" he triggers an importing and reading mechanism. The icon "L" can be displayed at page-level instead of the portlets control, namely within the toolbar, and appropriate portlet instances are determined on invocation. If no appropriate instances are available a clone can be created on the corresponding page if the portlet is deployed at all. Creating a clone means that an instance of a portlet able to consume the configuration data just being imported is created and placed onto the page. If the portlet is not even deployed, i.e. installed, an error message can be provided, indicating that no portlet able to consume the currently imported configuration data could be found. Hence, no clone and no portlet can be created.

The second user can configure the second portlet on the basis of the configuration data of the first portlet, resulting in that the second portlet contains the same five bookmarks or links as the first portlet as it is indicated in FIG. 8g.

When the first user can store his configuration data a manipulated WAR file is created which contains the current configuration data of the portlet. The WAR file (Web Application Archive) is a compressed archive containing the entire application logic making up a portlet. It contains (JAVA) binary (class) files, JSP (JavaServerPages) files and web- and portlet deployment descriptors etc. Especially the web- and portlet deployment descriptors contain (initial) configuration data of a portlet. An administrator uses WAR files to deploy, i.e. install, portlets into a portal. Hence, the initial configuration can be manipulated by manipulating the mentioned deployment descriptors, e.g. by injecting code into those. The new portlet containing the new configuration can then be deployed, i.e. installed by an administrator.

The file which is produced via the icon "S" are temporarily stored on disk or within a cache and can now be sent via email. The cache can be cleared after the corresponding file has been sent. The second user, namely the receiver, detaches the file to his disk and imports the file via the icon "L".

According to another possibility, the file describing the portlet configuration data produced via the icon "S" is stored in a document management system and can therefore be made available to a certain group of second users. These second users have to be authorized to have access to the document management system and therefore those users can be listed within an access control list (ACL). Allowed second users can import the file from the document management system in order to configure their own second portlets by means of the configuration file of the first portlet.

The present invention can be implemented on any now known or later developed computer system that is capable of executing computer program code. The computer program code can be provided on a computer-readable medium or provided in any other suitable manner.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method for exchanging portlet configuration data of a portal, comprising:
   providing a graphical user interface (GUI) component as part of a portlet view provided by a portal page for triggering a portlet configuration exchange process between a first user using a first portlet instance and a second user using a second portlet instance within the same portal, the first and second portlet instances being of the same portlet type,
   receiving a request for exchange of the portlet configuration data of the first portlet instance in response to an actuation of the GUI component by the first user,
   providing an export functionality allowing access to stored portlet configuration data of the first portal instance, extracting the stored portlet configuration data of the first portlet instance, and transforming the stored portlet configuration data into a generated data structure for exchange purposes of the portlet configuration data of the first portlet instance to the second user,
   allowing for exchange of the data structure via a defined communication channel between the first user and the second user, wherein a GUI dialog is displayed to the first user for specifying the defined communication for exchanging the portlet configuration data and the data structure is exported via the defined communication channel to a storage location,
   receiving a request to import the portlet configuration data of the first portlet instance by actuating the GUI component by the second user,
   providing an import functionality by displaying a GUI dialog to the second user for importing the data structure from the storage location and allowing for parsing of the data structure to provide new portlet configuration data of the second portlet instance and storing the new portlet configuration data of the second portlet instance, and
   displaying the second portlet instance of the second user using the new portlet configuration data.

2. The method according to claim 1, wherein the exchange of the portlet configuration data is accomplished by:
   retrieving information regarding a storage location of the data structure,
   transmitting the data structure using a mail transfer agent from the first user to the second user,
   retrieving information regarding the portlet to which the portlet configuration data transmitted via the mail transfer is to be applied, and
   displaying the second portlet instance using the new portlet configuration data.

3. The method according to claim 1, wherein the exchange of the portlet configuration data is accomplished by:
   retrieving information regarding a storage location of the data structure in a data management store of a data management system which allows for versioning and access control capabilities,
   retrieving information from the data management store regarding the portlet to which the portlet configuration data stored in the data structure is to be applied, and
   displaying the second portlet instance using the new portlet configuration data.

4. The method according to claim 1, wherein the exchange of the portlet configuration data is accomplished by:
   retrieving information regarding the second user to which the data structure is to be transmitted via JXTA,
   retrieving information regarding the portlet to which the portlet configuration data transmitted via JXTA is to be applied, and
   displaying the second portlet instance using the new portlet configuration data.

5. The method according to claim 4, further comprising:
   providing a subscription mechanism for automatically updating the second portlet instance of the second user as soon as the first user generates new portlet configuration data.

6. A portal stored on a non-transitory computer readable storage medium for exchanging portlet configuration data of a portal among at least one first user using a first portlet instance and at least one second user using a second portlet instance within the same portal, the portlet instances being of the same portlet type, wherein portlet configuration data of the first portlet instance has been created and stored and is accessible by the portal during aggregation, the portal comprising:
   a system for providing a graphical user interface (GUI) component as part of a portlet view provided by a portal page for triggering a portlet configuration exchange process between the first user and the second user,
   a system for receiving a request for exchange of the portlet configuration data of the first portlet instance in response to an actuation of the GUI component by the first user,
   a system for providing an export functionality allowing access to the stored portlet configuration data of the first portal instance, extracting the stored portlet configuration data of the first portlet instance, and for transforming the stored portlet configuration data into a generated data structure for exchange purposes of the portlet configuration data of the first portlet instance to the second user,
   a system for allowing for exchange of the data structure via a defined communication channel between the first user and the second user, wherein a GUI dialog is displayed to the first user for specifying the defined communication for exchanging the portlet configuration data and the data structure is exported via the defined communication channel to a storage location,
   a system for receiving a request to import the portlet configuration data of the first portlet instance by actuating the GUI component by the second user,
   a system for providing an import functionality by displaying a GUI dialog to the second user for importing the data structure from the storage location and allowing for parsing the data structure to provide new portlet configuration data of the second portlet instance and for storing the new portlet configuration data of the second portlet instance, and a system for displaying the second portlet instance of the second user using the new portlet configuration data.

7. The portal according to claim 6, further comprising:

a system for retrieving information regarding a storage location of the data structure, a system for transmitting the data structure using a mail transfer agent from the first user to the second user, a system for retrieving information regarding the portlet to which the portlet configuration data transmitted via the mail transfer is to be applied, and a system for displaying the second portlet instance using the new portlet configuration data.

8. The portal according to claim 6, further comprising:

a system for retrieving information regarding a storage location of the data structure in a data management store of a data management system which allows for versioning and access control capabilities, a system for retrieving information from the data management store regarding the portlet to which the portlet configuration data stored in the data structure is to be applied, and a system for displaying the second portlet instance using the new portlet configuration data.

9. The portal according to claim 6, further comprising:

a system for retrieving information regarding the second user to which the data structure is to be transmitted via JXTA, a system for retrieving information regarding the portlet to which the portlet configuration data transmitted via JXTA is to be applied, and a system for displaying the second portlet instance using the new portlet configuration data.

10. The portal according to claim 9, further comprising:

a system for providing a subscription mechanism for automatically updating the second portlet instance of the second user as soon as the first user generates new portlet configuration data.

* * * * *